United States Patent
Lee et al.

(10) Patent No.: US 7,463,601 B2
(45) Date of Patent: Dec. 9, 2008

(54) METHOD AND APPARATUS FOR SCHEDULING MULTIPLE USERS IN A MOBILE COMMUNICATION SYSTEM USING MULTIPLE TRANSMIT/RECEIVE ANTENNAS

(75) Inventors: Hak-Joo Lee, Seoul (KR); Chung-Yong Lee, Seoul (KR); Jae-Hak Chung, Seoul (KR); Chan-Soo Hwang, Yongin-si (KR)

(73) Assignees: Samsung Electronics Co., Ltd. (KR); Yonsei University (KR)

( * ) Notice: Subject to any disclaimer, the term of this patent is extended or adjusted under 35 U.S.C. 154(b) by 573 days.

(21) Appl. No.: 10/830,954

(22) Filed: Apr. 23, 2004

(65) Prior Publication Data

US 2005/0032521 A1  Feb. 10, 2005

(30) Foreign Application Priority Data

Aug. 7, 2003  (KR) .................... 10-2003-0054674

(51) Int. Cl.
*H04Q 7/00* (2006.01)
(52) U.S. Cl. .................. 370/328; 375/285; 375/267; 375/347
(58) Field of Classification Search ................ 370/328; 375/285, 267, 347
See application file for complete search history.

(56) References Cited

U.S. PATENT DOCUMENTS 5,752,168 A * 5/1998 Monot et al. ............. 455/67.13
6,144,711 A * 11/2000 Raleigh et al. ............. 375/347
2003/0043929 A1* 3/2003 Sampath .................... 375/267
2003/0235255 A1* 12/2003 Ketchum et al. ........... 375/285

FOREIGN PATENT DOCUMENTS

| JP | 2001-352283 | 12/2001 |
|---|---|---|
| JP | 2003-174664 | 6/2003 |
| JP | 2003-179965 | 6/2003 |

(Continued)

OTHER PUBLICATIONS

Love et al., "Grassmannian Beamforming for Multiple-Input Multiple-Output Wireless Systems", 2003 IEEE International Conference On Communications, vol. 1 of 5, May 11, 2003.

(Continued)

*Primary Examiner*—Vincent P. Harper
*Assistant Examiner*—Charles Shedrick
(74) *Attorney, Agent, or Firm*—The Farrell Law Firm, PC

(57) ABSTRACT

Disclosed herein is a scheduling method and apparatus based on eigen values robust against spatial correlation in a mobile communication system supporting multiple users by use of multiple transmit/receive antennas. A user terminal estimates channel characteristics from the transmit antennas to the user terminal, decomposes the estimated channel characteristics into receive channel characteristics and transmit channel characteristics, and feeds back a transmit principal eigen vector to the base station (BS). The BS selects a predetermined number of user terminals having the least correlation using the feedback principal eigen vectors from a plurality of user terminals, constructs a user precoding matrix by combining the principal eigen vectors of the selected user terminals, multiplies data streams for the selected user terminals by the user precoding matrix and transmits the multiplied data to the selected user terminals.

14 Claims, 8 Drawing Sheets

FOREIGN PATENT DOCUMENTS

| WO | WO 98/09381  | 3/1998 |
| WO | WO 03/023995 | 3/2003 |
| WO | WO 03/041300 | 5/2003 |

OTHER PUBLICATIONS

Chan-Soo Hwang et al., A Random Beamforming Technique in MIMO Systems Exploiting Multiuser Diversity, 2003.

Robert W. Heath Jr et al., Multiuser Diversity for MIMO Wireless Systems With Linear Receivers, Nov. 7, 2001.

Wolfgang Utschick et al., Efficient Tracking and Feedback of DL-Eigenbeams in WCDMA, Feb. 2000.

Siemens, Advanced Closed Loop Tx Diversity Concept (Eigenbeamformer), 3GPP TSG RAN WG 1, Meeting #14, vol. 97, No. 549, Jul. 4-7, 2000.

* cited by examiner

METHOD AND APPARATUS FOR SCHEDULING MULTIPLE USERS IN A MOBILE COMMUNICATION SYSTEM USING MULTIPLE TRANSMIT/RECEIVE ANTENNAS

PRIORITY

This application claims priority under 35 U.S.C. § 119 to an application entitled "Method and Apparatus for Scheduling Multiple Users in a Mobile Communication System Using Multiple Transmit/Receive Antennas" filed in the Korean Intellectual Property Office on Aug. 7, 2003 and assigned Serial No. 2003-54674, the contents of which are incorporated herein by reference.

BACKGROUND OF THE INVENTION

1. Field of the Invention

The present invention relates generally to a mobile communication system supporting multiple users by use of multiple transmit/receive antennas, and in particular, to an eigen-based scheduling method and apparatus which are robust against spatial correlation.

2. Description of the Related Art

Conventional TDM (Time Division Multiplexing) or CDM (Code Division Multiplexing) mobile communication systems are not suitable to support future-generation high-speed multimedia transmission because they were developed to service low-speed data, which mainly consist of voice data. To realize high-speed transmission, there is a need to develop techniques to improve the efficiency of use of the limited frequency resources. A main technique proposed as a solution is MIMO (Multiple Input and Multiple Output) using multiple transmit/receive antennas.

A multi-transmit/receive antenna system applies an appropriate space-time signal processing scheme to a transmitter/receiver using a plurality of transmit/receive antennas. The resulting increase in efficiency of frequency use allows a high data rate with a limited bandwidth. It is known that a maximum available data rate conforms with the capacity of a radio channel that delivers a signal and the theoretical capacity of the radio channel for which a sufficient number of paths exists is approximately proportional to the number of the transmit/receive antennas.

A single-antenna TDM mobile communication system uses channels only in the time domain because one frequency channel is divided into a plurality of time slots. On the other hand, a multi-transmit/receive antenna system forms a plurality of sub-channels in the spatial domain and transmits different data simultaneously on the sub-channels, irrespective of whether a transmitter needs channel information. The sub-channels are equivalent to radio paths from a plurality of transmit antennas to a receiver. With this characteristic, the multi-transmit/receive antenna system can achieve a higher data rate than the single-antenna system.

Past studies on multi-transmit/receive antenna systems have focused mainly on development of techniques for increasing data transmission efficiency or reducing transmission errors in a single-user system with a single transmitter and a single receiver.

Since multiple user terminals are mutually independent in a geographical location and propagation environment, radio channels between a base station (BS) and the user terminals are also independent of each other. Therefore, there may exist users in a channel environment suitable for data transmission in a particular time (i.e. time slots) as well as users in a channel environment not suitable for data transmission due to fading, for example. Considering the channel independency, the BS assigns transmit antennas to optimum users in each time slot, to thereby maximize system capacity. This operation is called scheduling. Scheduling is a very complicated task involving diverse factors such as the varied channel environments of the user terminals, the amount of data to be transmitted, and priority levels.

FIG. 1 illustrates an assignment of space and time by MIMO scheduling in a multi-user environment. In the example of FIG. 1, four antennas are assigned among different users in each time slot.

The main point of MIMO scheduling is how to assign transmit antennas on a BS side and how to detect signals from the BS on the user terminals side.

FIG. 2 illustrates the configuration of a MIMO mobile communication system that schedules in a typical manner. M users are selected among a total of K users (M is the number of transmit antennas).

Referring to FIG. 2, a BS is servicing, i.e. providing data, to K users. The BS transmits data to M user terminals 40 to 44 through M (M<K) antennas 22 in one time slot. That is, a scheduler 20 selects user data for the M user terminals 40 to 44 under optimum channel environments from K user buffers 10 to 14 and transmits the user data to the selected user terminals through corresponding antennas.

Traditionally in the scheduling, an optimum user is selected for each transmit antenna based on the SNRs (Signal to Noise Ratios) of respective transmit antennas fed back as channel information from all users receiving data service. When the BS provides a data service to K users each using N receive antennas through M transmit antennas, feedback information from a kth user to the BS is described by the following Equation 1:

$$\gamma_k = [\gamma_{1,k} \ \gamma_{2,k} \ \dots \ \gamma_{M,k}]^T, \quad k = 1, 2, \dots, K \qquad (1)$$
$$= \frac{1}{[H_k^H H_k]_{\min}^{-1}}, \qquad m = 1, 2, \dots, M$$

where $\gamma_{ij}$ denotes the SNR of a channel from an ith transmit antenna to a jth user and superscript H denotes a Hermitian matrix. The scheduler 20 selects users having the best SNRs for the respective transmit antennas in accordance with the following Equation 2:

$$d_m = \arg\max_k(\gamma_{m,k}) \qquad (2)$$

where $d_m$ is the index of a user selected for an mth antenna. The scheduler 20 then selects data $S_{d1}, S_{d2}, \dots, S_{dM}$ for the selected users and transmits them to the M transmit antennas through a multiplexer (not shown).

The kth user estimates a channel matrix $H_k$ representing channel characteristics from the transmit antennas to the receive antennas and detects the data $S_{dk}$ transmitted by the transmitter by a detection algorithm, such as ZF (Zero-Forcing). A ZF receiver independently detects data simply through the inversion of the channel matrix, thereby reducing receiver complexity.

Under the assumption that a data stream transmitted through the M transmit antennas is an M×1 signal vector and a matrix representing the characteristics of a radio channel 30 that delivers the transmit signal vector is H, a receiver with N receive antennas receives an N×1 signal vector r that can be expressed in accordance with the following Equation 3:

$$r = Hs + w \quad (3)$$

where w denotes Gaussian noise which is an (N×1) vector since it is induced to each receive antenna and H is an N×M matrix because signals transmitted from the M transmit antennas arrive at the N receive antennas via different paths.

However, when the channel spatial correlation is high, for example, when the transmit antennas are widely spaced, the rank of the channel matrix is reduced. As a result, there is no inverse matrix, or if there is an inverse matrix, each element in the inverse matrix has a very great value. The matrix rank refers to the number of independent column pairs.

Let $r_k$ denote a signal vector received at the kth user from an mth transmit antenna. The kth user then detects data in accordance with the following Equation 4:

$$\hat{s}_{k,m} = \sqrt{\frac{E_s}{M}} s_{k,m} + [H_k^{-1} n_k]_m \quad (4)$$

$$= [H_k^{-1} r_k]_m$$

where $S_{k,m}$ is the transmitted data, $\hat{s}_{k,m}$ is the detected data, and $n_k$ is a noise vector introduced to the kth user. Therefore, the variance of $[H_k^{-1} n_k]_m$ is $N_0 [H_k^H H_k]_{mm}^{-1}$. As noted, when the values of elements in the inverse of the channel matrix increase with spatial correlation, the effects of noise also become serious.

FIG. 3 is a graph illustrating ergodic capacity versus spatial correlation in a simulated conventional scheduling method. The simulation was performed under the conditions of four transmit antennas, four receive antennas, 50 users, and an SNR of 20 dB. As illustrated, in the conventional scheduling, as spatial correlation increases, the power of noise in a detected signal also increases. Thus, system performance rapidly deteriorates.

SUMMARY OF THE INVENTION

An object of the present invention is to substantially solve at least the above problems and/or disadvantages and to provide at least the advantages described below. Accordingly, an object of the present invention is to provide a scheduling method and apparatus for reducing the effects of noise when high channel spatial correlation exists in a mobile communication system that services multiple users by use of multiple transmit/receive antennas.

Another object of the present invention is to provide an eigen-based scheduling method and apparatus which are robust against spatial correlation in a mobile communication system that services multiple users by use of multiple transmit/receive antennas.

The above objects are achieved by providing a scheduling method and apparatus based on eigen values robust against spatial correlation in a mobile communication system supporting multiple users by use of multiple transmit/receive antennas.

According to one aspect of the present invention, in a method of transmitting feedback information for data scheduling in a user terminal accessing a base station (BS) that services a plurality of user terminals each using a plurality of receive antennas through a plurality of transmit antennas, the user terminal estimates channel characteristics from the transmit antennas to the user terminal, decomposes the estimated channel characteristics into receive channel characteristics and transmit channel characteristics, and feeds back a transmit principal eigen vector to the BS. Here, the principal eigen vector is the largest value of the transmit channel characteristics.

According to another aspect of the present invention, in a method of scheduling data for a plurality of user terminals based on principal eigen vectors fed back from the user terminals in a BS that services the user terminals each having a plurality of receive antennas through a plurality of transmit antennas, the BS selects a predetermined number of user terminals having the least correlation using the feedback principal eigen vectors received from the plurality of user terminals, constructs a user precoding matrix by combining the principal eigen vectors of the selected user terminals being serviced by the BS, multiplies data streams for the selected user terminals by the user precoding matrix, and transmits the multiplied data to the selected user terminals.

BRIEF DESCRIPTION OF THE DRAWINGS

The above and other objects, features and advantages. of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail to avoid obscuring the invention with unnecessary detail.

The present invention as described below pertains to optimum scheduling to allow transmission of more data in a mobile communication system that services multiple users via multiple transmit/receive antennas. In the present invention, each user terminal receiving data service reports to a BS only the principal eigen vector of a channel matrix representing the best channel characteristic between the transmit antennas of the BS and the receive antennas of the user terminal. The BS selects user terminals having least correlations based on the feedback principal eigen vectors of the channel matrices.

Figure 1:
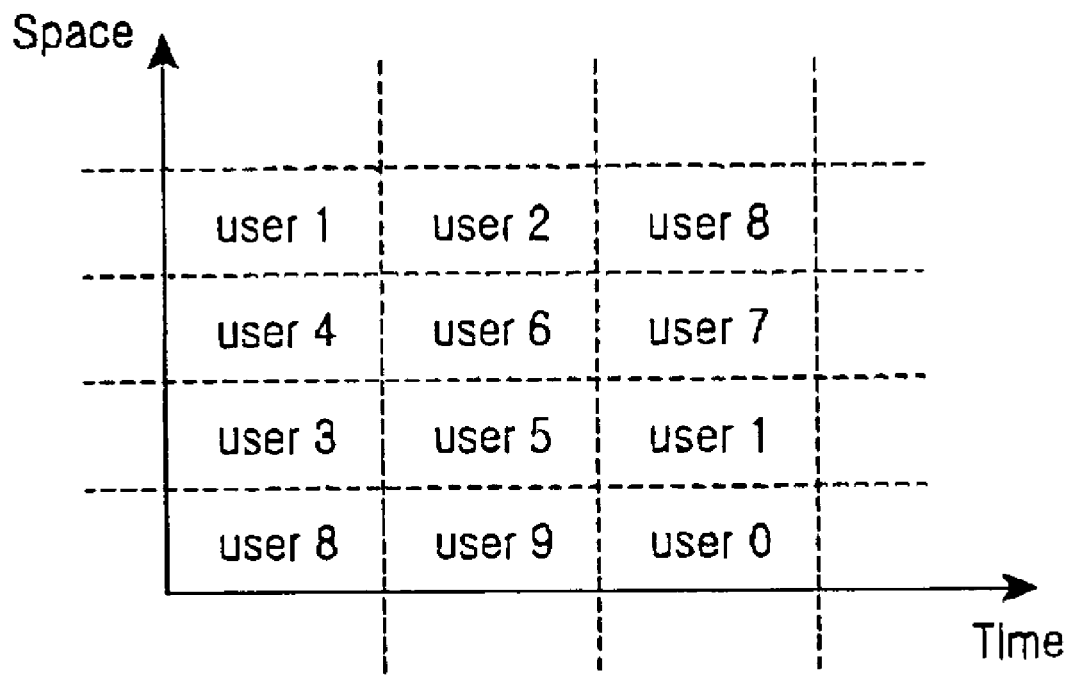
FIG. 1 illustrates an assignment of space and time by MIMO scheduling under a multiple-user environment.
Figure 2:
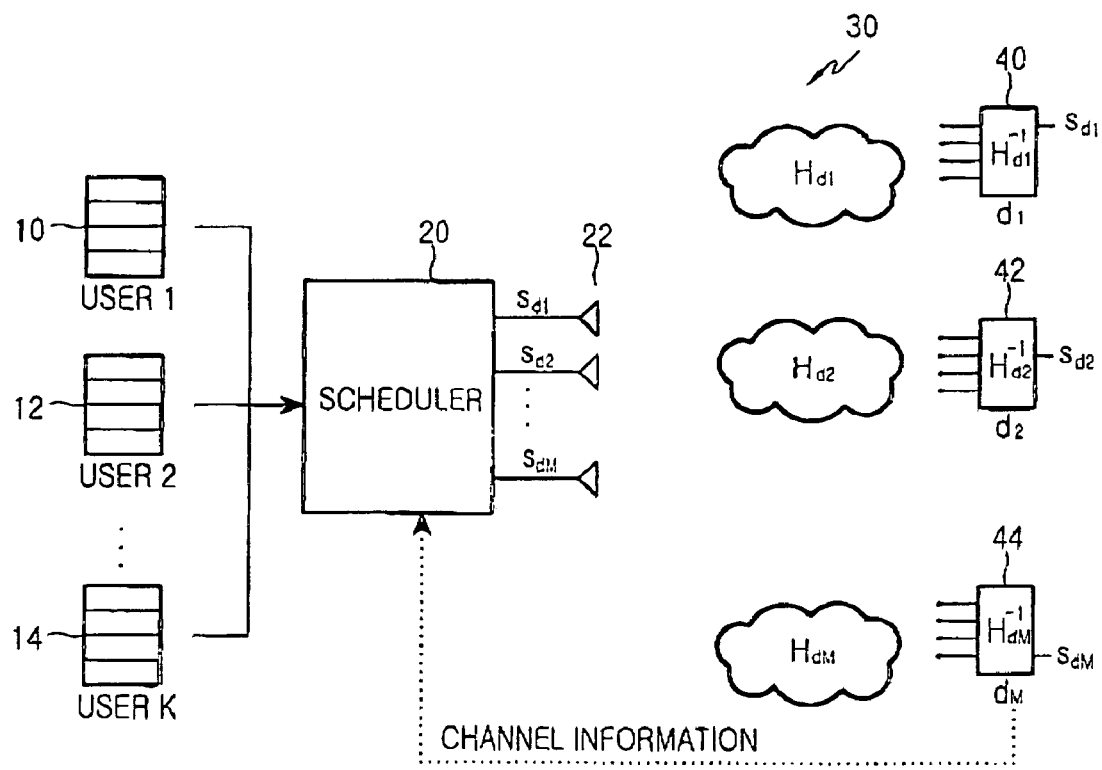
FIG. 2 illustrates the configuration of a MIMO mobile communication system that schedules in a typical manner.
Figure 3:
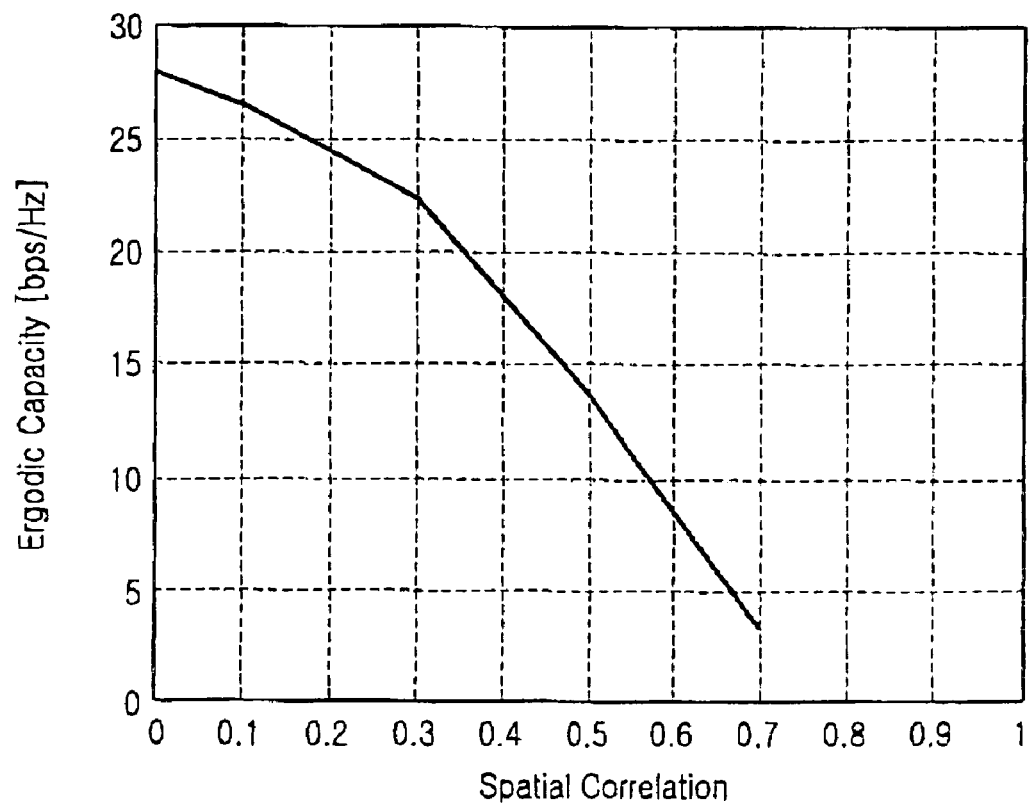
FIG. 3 is a graph illustrating ergodic capacity versus spatial correlation in a simulated conventional scheduling method.
Figure 4:
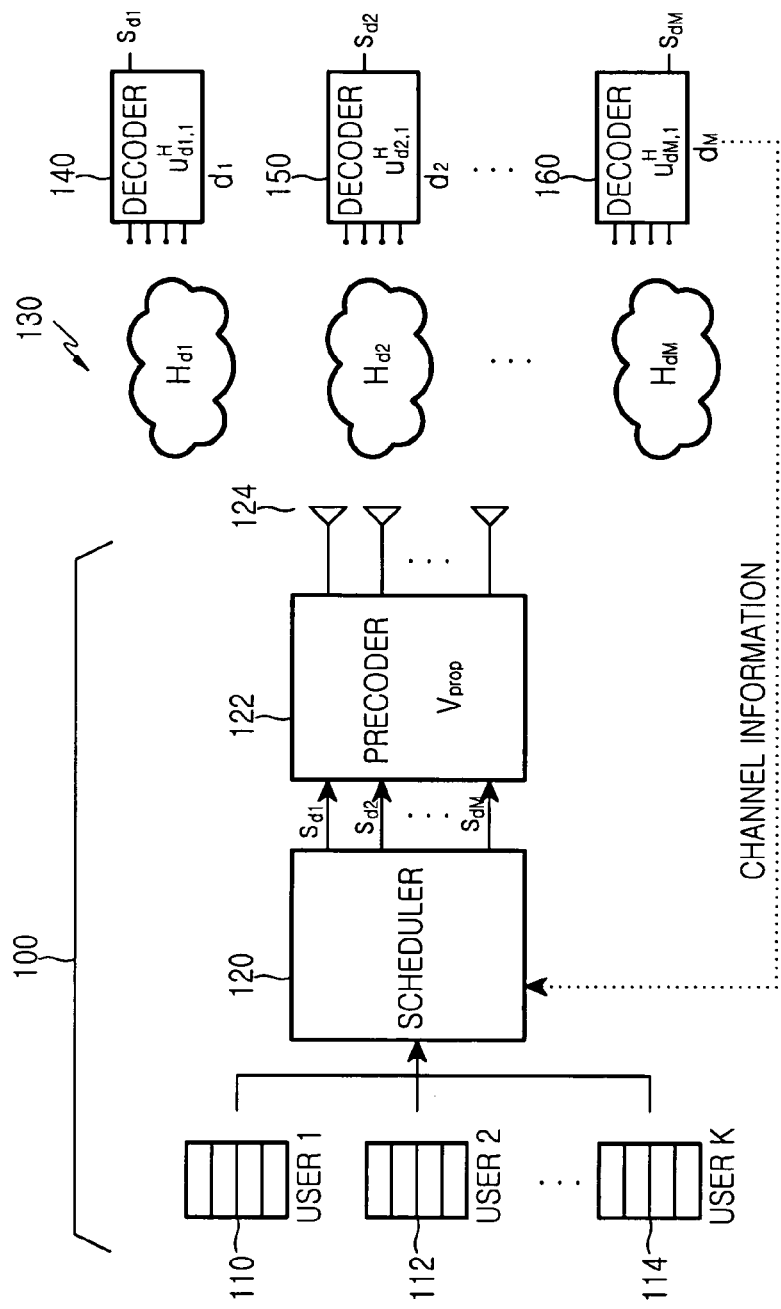
FIG. 4 illustrates the configuration of a mobile communication system that schedules multiple users according to an embodiment of the present invention.

FIG. 4 illustrates the configuration of a mobile communication system that schedules multiple users according to an embodiment of the present invention. While M users are selected from a total of K users (M is the number of transmit antennas) in the embodiment, it will be recognized that the number of selected users can be decided to be less than K, irrespective of the number of the transmit antennas.

Referring to FIG. 4, K users receive a data service from a BS 100 and the BS 100 transmits corresponding data to M users 140 to 160 through M (M≦K) antennas 124 during one time slot. That is, a scheduler 120 selects user data for a set of the M user terminals 140 to 160 in optimum channel environments from K user buffers 110 to 114 for each time slot. A precoder 122 preliminarily compensates the selected user data for transmit channel characteristics, prior to transmission.

The signals transmitted from the M antennas 124 arrive at the M user terminals 140 to 160 via different channel environments for the respective antennas of the user terminals. Each of the user terminals 140 to 160 recovers original user data by multiplying a received signal by an eigen vector, which is an information stream representing receive channel characteristics.

To allow the pre-compensation of the user data in the BS and the data recovery in the user terminals, all user terminals estimate channel characteristics from the transmit antennas 124 of the BS and report the estimated information to the BS.

Channel matrices $H_{d1}$, $H_{d2}$, ..., $H_{dK}$ representing the channel characteristics from the transmit antennas to the respective K user terminals are N×M matrices for N receive antennas in each of the user terminals. According to the known singular decomposition theory, the channel matrix is decomposed into the gain of a radio channel (matrix $\Lambda$), transmit channel characteristics (matrix V), and receive channel characteristics (matrix U). Under the assumption that there are an equal number of transmit and receive antennas for notational simplicity, the channel matrix of a kth user terminal is expressed by the following Equation 5:

$$H_k = U_k \Lambda_k V_k^H \qquad (5)$$
$$= [\mu_{k,1}, \mu_{k,2}, \ldots, \mu_{k,M}][\lambda_{k,1}, \lambda_{k,2}, \ldots, \lambda_{k,M}]$$
$$[v_{k,1}, v_{k,2}, \ldots, v_{k,M}]^H$$

where $\mu_{k,i}$ is an M×1 vector representing the receive channel characteristic of an ith sub-channel, $v_{k,i}$ is an M×1 vector representing the transmit channel characteristic of the ith sub-channel, and $\Lambda_k$ is an M×M diagonal matrix comprising K $\lambda_{k,i}$'s representing the channel gains of the ith sub-channel. There is no need for compensating for $\Lambda_k$ because $\Lambda_k$ does not affect the meaning of the data.

Each user terminal decomposes the channel matrix representing its estimated channel characteristics, as illustrated in Eq. (5) and reports to the BS the vector representing the best characteristic, namely the principal eigen vector of the transmit channel matrix $V_k$. This allows the BS to select a terminal having the best characteristic, and thus makes it is unnecessary to notify the BS of other channel characteristics. The transmit channel matrix $V_k$ is an array of channel characteristic measurements arranged in a descending order, from best to worst. Hence, the principal eigen vector is the first element $V_{k,1}$.

The scheduler 120 in the BS selects a set of users having the least correlation based on the principal eigen vectors $v_{1,1}$, $v_{2,1}$, ..., $v_{K,1}$ received from the K user terminals. The correlation between an ith user and a jth user is determined as described by the following Equation 6:

$$\rho_{i,j} = v_{i,1}^H v_{j,1} (i \neq j, i,j=1,2,\ldots,K) \qquad (6)$$

Generally, K is much greater than M. Thus, a large volume of computation would be required to select the users if a full search were performed. In accordance with the present invention, the scheduler 120 selects users iteratively by the following procedure.

The first user, which has the least correlation among the K users, is selected in accordance with the following Equation 7:

$$d_1 = \arg\min_k \left( \sum_{j=1, j \neq k}^{K} \|v_{dk,1}^H v_{dj,1}\|^2 \right) \qquad (7)$$

where $\min_k(.)$ denotes selection of the kth user that minimizes the formula within the bracket. The first user is selected by considering the correlation with the other users receiving service from the base station.

The second user is selected in accordance with the following Equation 8:

$$d_2 = \arg\min_k \left( \|v_{d1,1}^H v_{dk,1}\|^2 \right) \qquad (8)$$

The second user is selected in consideration of correlations with the other users except the first selected user. The remaining users starting from the third user are selected in consideration of correlations with the other users, except the earlier selected users, as described by the following Equation 9:

$$d_3 = \arg\min_k \left( \|v_{d1,1}^H v_{dk,1}\|^2 + \|v_{d2,1}^H v_{dk,1}\|^2 \right) \qquad (9)$$
$$\vdots$$
$$d_M = \arg\min_k \left( \|v_{d1,1}^H v_{dk,1}\|^2 + \|v_{d2,1}^H v_{dk,1}\|^2 \ldots + \|v_{d(M-1),1}^H v_{dk,1}\|^2 \right)$$

The scheduler 120 constructs data streams for the selected M user terminals 140 to 160 in the form of vector $S=[S_{d1}, S_{d2}, \ldots, S_{dM}]^T$, and feeds the vector s and M principal eigen vectors corresponding to the M user terminals 140 to 160 to the precoder 122.

The precoder 122 combines the M principal eigen vectors in the form of an M×M user precoding matrix and compensates for the transmit channel characteristics in advance, using the user precoding matrix. That is, the precoder 122 generates a transmit signal vector x by multiplying the data vectors by the user precoding matrix $V=[v_{d1,1}, v_{d2,1}, \ldots, v_{dM,1}]$. x is described by the following Equation 10:

$$x = V \cdot s = \sqrt{\frac{Es}{M}} \sum_{m=1}^{M} v_{dm,1} s_{dM} \qquad (10)$$

where the data vector s is an M×1 vector containing the selected M data symbols, $d_m$ represents IDs of the M user terminals, V is an M×M user precoding matrix including M×1 vectors $v_{d1,1}, v_{d2,1}, \ldots, v_{dm,1}$, Es is the power to noise ratio of the transmitter, and M is the number of the transmit antennas.

A $d_m$th user terminal among the M user terminals 140 to 160 receives from the transmit antennas of the BS a signal vector that can be expressed in accordance with the following Equation 11:

$$\gamma_{dm} = H_{dm}x + n_{dm}$$

$$= \sqrt{\frac{E_s}{M}} \lambda_{dm} \mu_{dm,1} s_{dm} + \sqrt{\frac{E_s}{M}} H_{dm}\left(\sum_{i=1,i\neq m}^{M} v_{di,1} s_{di}\right) + n_{dm}$$

where $n_{dm}$ is a vector representing Gaussian noise generated from a channel from the transmit antennas 124 to the $d_m$th user terminal and $\lambda_{dm}$ is a constant representing an eigen value of a channel matrix from the transmit antennas 124 to the $d_m$th user terminal. An eigen value refers to a channel gain in an eigen-vector direction (corresponding to a sub-channel). The channel matrix H is an N×M matrix because signals transmitted from the M antennas arrive at the N receive antennas in different paths. The second term in the last formula of Eq. (11), i.e.

$$\sqrt{\frac{E_s}{M}} H_{dm}\left(\sum_{i=1,i\neq m}^{M} v_{di,1} s_{di}\right),$$

represents interference from other users.

Figure 5:
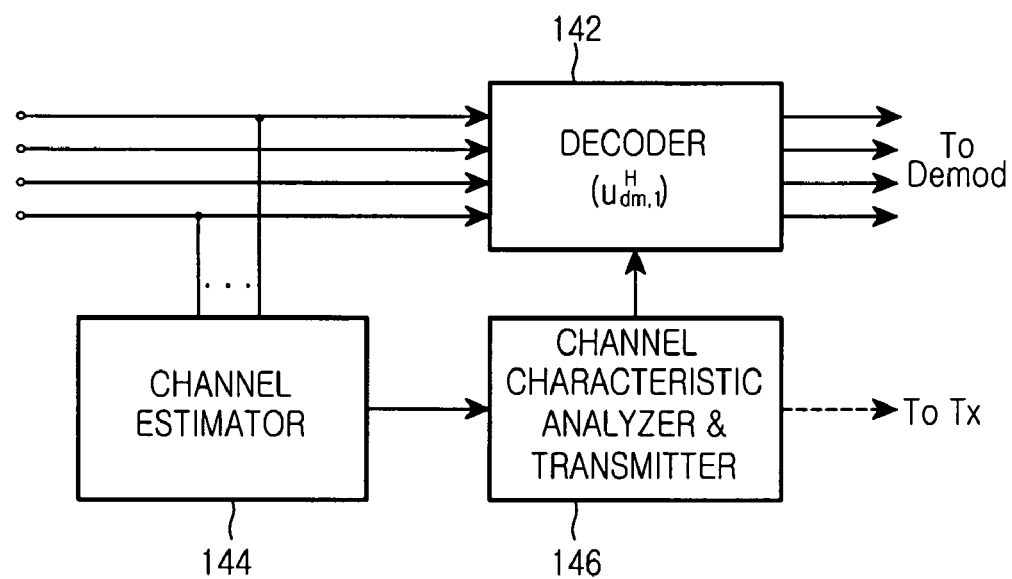
FIG. 5 is a block diagram of a user terminal for detecting user data from a received signal.

FIG. 5 is a block diagram of a user terminal for detecting user data from a received signal.

Referring to FIG. 5, a channel estimator 144 in the $d_m$th user terminal estimates channel characteristics from the transmit antennas to the receive antennas using signals received via the receive antennas. A channel characteristic analyzer & transmitter 146 calculates a principal eigen vector $v_{dm,1}$ representing a transmit channel characteristic according to the estimated channel characteristic information and feeds the principal eigen vector back to the BS. At the same time, the channel characteristic analyzer & transmitter 146 calculates a principal eigen vector $u_{dm,1}^H$ representing a receive channel characteristic and transmits it to a decoder 142.

The decoder 142 multiplies the received signal vector by $u_{dm,1}^H$, thereby detecting data transmitted from the BS, expressed by the following Equation 12:

$$\mu_{dm,1}^H \gamma_{dm} = \sqrt{\frac{E_s}{M}} \lambda_{dm} s_{dm} + \sqrt{\frac{E_s}{M}} \lambda_{dm} v_{dm,1}^H \left(\sum_{i=1,i\neq m}^{M} v_{di,1} s_{di}\right) + \mu_{dm,1}^H n_{dm}$$

$$= \sqrt{\frac{E_s}{M}} \lambda_{dm}(s_{dm} + \rho_{dmd2} s_{d2} + \rho_{dmd3} s_{d3} + \ldots + \rho_{dmdM} s_{dM}) + \mu_{dm,1}^H n_{dm}$$

where $\rho_{didj}$ is $v_{di}^H v_{dj}$ representing the correlation between the principal eigen vectors of ith and jth user terminals. The scheduler 120 selects users that have the least eigen vector correlation.

Figure 6:
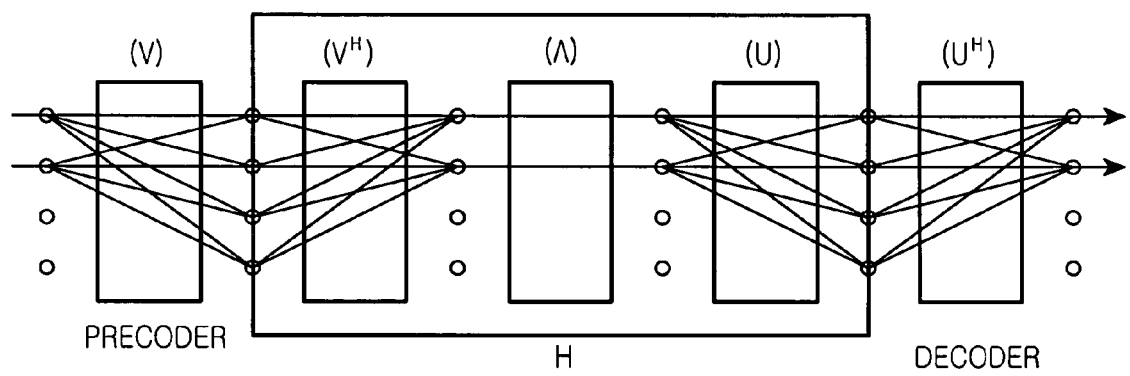
FIG. 6 conceptually illustrates transmission using principal eigen vectors, that is, eigen-mode transmission according to the present invention.

FIG. 6 is a conceptual view illustrating transmission using principal eigen vectors, that is, eigen-mode transmission. As illustrated, the user precoding matrix V, which was multiplied by data, compensates, at the precoder of the BS, for the transmit channel characteristic $V^H$ on a MIMO channel, and the decoder of the user terminal compensates for the receive channel characteristic U by multiplying a received signal by the principal receive eigen vector $U^H$. A superscript H is different from H of a channel characteristic. That is, the superscript H indicates inverse of a matrix or vector. $A \cdot A^H = I$, wherein I indicates an identity matrix.

The above-described scheduling according to the present invention allows data transmission/reception without computing the inverses of the channel matrices between the BS and the user terminals. Hereinbelow, the performance of scheduling according to the present invention and the conventional scheduling is compared in terms of cell capacity.

Given an ideal receiver, the cell capacity of a single-user AWGN (Additive White Gaussian Noise) MIMO system is described by the following Equation 13:

$$C_k = \log\det\left|I_N + \frac{Es}{NoM} H_k^H H_k\right| \qquad (13)$$

$$= \sum_{m=0}^{M} \log\left(1 + \frac{Es}{NoM} \lambda_m^2 H_k\right)$$

where $C_k$ is the cell capacity of a kth user, det 1·1 denotes the determinant of a square matrix, $I_N$ is an identity matrix of size N, Es is the power to noise ratio of the transmitter, No is Gaussian noise, M is the number of the transmit antennas, $H_k$ is a channel matrix representing channel characteristics from the transmit antennas to a kth user, and $\lambda_m$ is an eigen value of $H_k$. An mth eigen value of a channel matrix is the channel gain of an mth sub-channel.

When the receiver in the MIMO system adopts the ZF technique at the risk of performance in order to reduce receiver complexity, the cell capacity is determined by the following Equation 14:

$$C_k = \sum_{m=0}^{M} \log\left(1 + \frac{Es}{NoM} \frac{1}{[H_k^H H_k]_{mm}^{-1}}\right) \qquad (14)$$

In the conventional scheduling, the cell capacity is described by the following Equation 15:

$$C_{total} = \sum_{m=0}^{M} \log\left(1 + \frac{Es}{NoM} \max_k \frac{1}{[H_k^H H_k]_{mm}^{-1}}\right) \qquad (15)$$

and the cell capacity in the scheduling of the present invention is described by the following Equation 16:

$$C_{total} = \sum_{m=0}^{M} \log\left(1 + \frac{1}{M(Es/No)^{-1} + \sum_{j=1, j\neq m}^{M} \lambda_{dm}^2 |\rho_{dmdj}|^2} \lambda_{dm}^2\right) \quad (16)$$

where $\lambda_{dm}$ is the channel gain of the $d_m$th user. Compared to Eq. (15), Eq. (16) further includes the effects of interference. However, since $\lambda_{dm}$ increases as spatial correlation increases, the present invention offers cell capacity approximate to that achieved by use of an ideal receiver.

Figure 7:
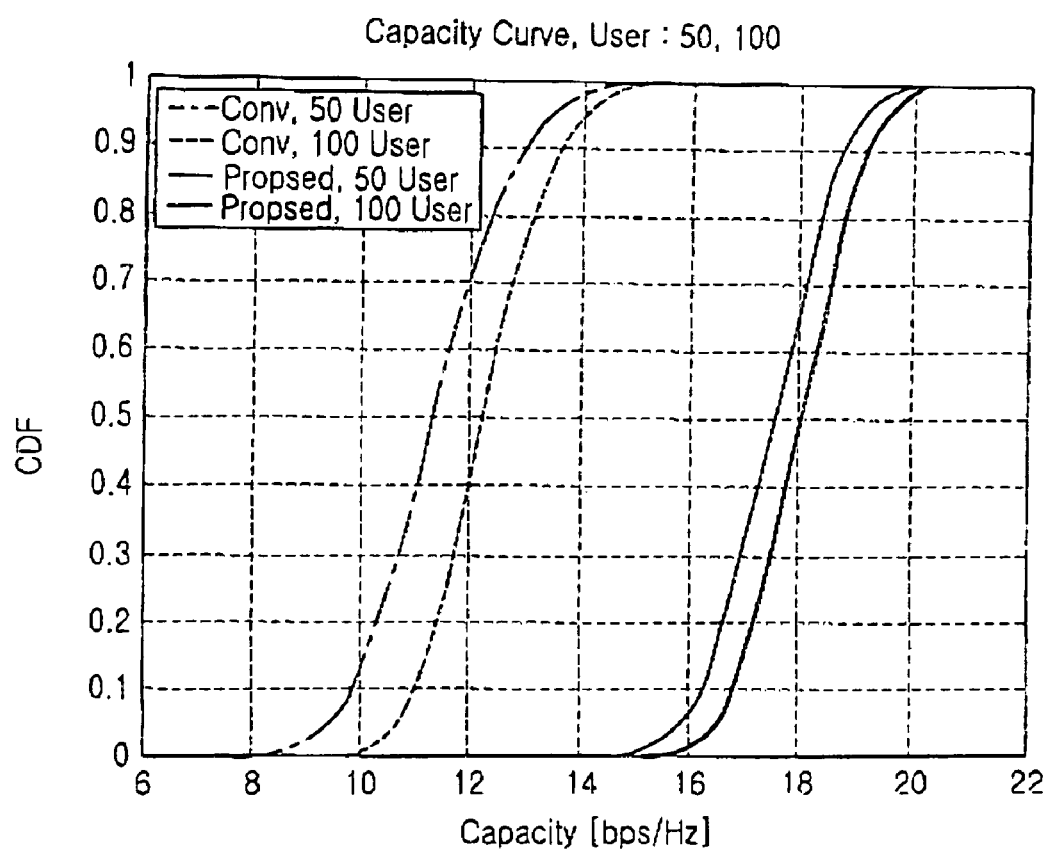
FIGS. 7 and 8 are graphs comparing scheduling according to the present invention with the conventional scheduling in cell capacity and BER (Bit Error Rate).
Figure 8:
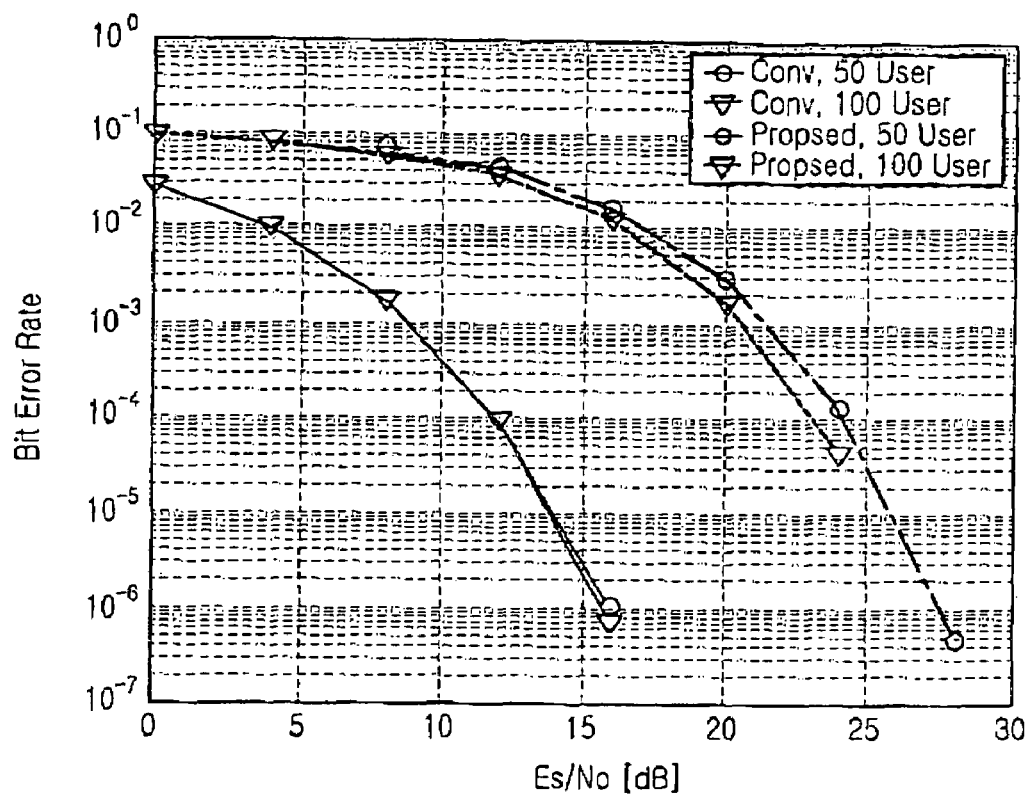

FIGS. 7 and 8 are graphs comparing the scheduling of the present invention with the conventional scheduling in terms of cell capacity and Bit Error Rate (BER). The schedulings were simulated under the conditions that four transmit antennas and four receive antennas are used, a scheduler selects two users, and two cases with a total of 50 and 100 users are considered. In general, there are sufficient scattering around each user receiver. Therefore, channel independency is ensured between the receive antennas and spatial correlation with a DOA (Degree Of Arrival) of 0 degrees and an angle spread of 15 degrees is set between the transmit antennas of the BS.

FIG. 7 illustrates the Cumulated Density Function (CDF) of cell capacity when Es/No=20 dB. As illustrated, the present invention achieves a gain of 6.2 bps/Hz for 50 users and a gain of 5.85 bps/Hz for 100 users in ergodic capacity.

Referring to FIG. 8, the present invention offers a gain of 12 dB or greater for a required BER of $10^{-3}$.

Accordingly, the significant advantages of the present invention include selecting users having the best channels based on principal eigen values in a radio environment with high spatial correlation, and allowing for data detection by simple vector multiplication, to simplify receiver configuration. Since communication is guaranteed all the time for a predetermined number of users, fairness problems do not arise. Furthermore, the effects of interference are reduced by limiting the number of active users, and cell capacity is significantly increased by concentrating transmit power.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of transmitting feedback information for data scheduling in a user terminal accessing a base station (BS) that services a plurality of user terminals each using a plurality of receive antennas via a plurality of transmit antennas, comprising the steps of:
    estimating channel characteristics from the transmit antennas to the user terminal;
    decomposing the estimated channel characteristics into receive channel characteristics and transmit channel characteristics;
    calculating a principal eigen vector representing a largest value of the transmit channel characteristics; and
    feeding back the transmit principal eigen vector to the BS; wherein the channel characteristics are decomposed by $$H_k = U_k \Lambda_k V_k^H$$
$$= [\mu_{k,1}, \mu_{k,2}, \ldots, \mu_{k,M}][\lambda_{k,1}, \lambda_{k,2}, \ldots, \lambda_{k,M}][v_{k,1}, v_{k,2}, \ldots, v_{k,M}]^H$$

where $H_k$ is a channel matrix representing channel characteristics for a kth user, $U_k$ is a matrix representing receive channel characteristics for the kth user, $\mu_{k,i}$ is a vector representing the receive channel characteristic of an ith sub-channel, $\Lambda_k$ is a diagonal matrix representing channel gains for the kth user, $\lambda_{k,i}$ is a constant representing the channel gain of the ith sub-channel, $V_k$ is a matrix representing transmit channel characteristics for the kth user, and $v_{k,i}$ is a vector representing the transmit channel characteristic of the ith sub-channel.

2. The method of claim 1, wherein the user terminals feeds back $v_{k,1}$ to the BS in the feedback step.

3. The method of claim 1, further comprising detecting a desired data stream by a signal received from the BS by $\mu_{k,i}^H$.

4. A method of scheduling data for a plurality of user terminals based on principal eigen vectors fed back from the user terminals in a base station (BS) that services the user terminals each having a plurality of receive antennas via a plurality of transmit antennas, comprising the steps of:
    selecting a predetermined number of user terminals having a least correlation using the feedback principal eigen vectors from the plurality of user terminals;
    constructing a user precoding matrix by combining the principal eigen vectors of the selected user terminals; and
    multiplying data streams for the selected user terminals by the user precoding matrix and transmitting the multiplied data to the selected user terminals.

5. The method of claim 4, wherein the user terminal selecting step comprises the steps of:
    selecting a first user terminal having a least correlation with respect to the other plurality of user terminals; and
    sequentially selecting additional user terminals each having the least correlation with respect to the other plurality of user terminals, except earlier selected user terminals.

6. The method of claim 5, wherein the user terminals are selected by $$d_1 = \mathrm{argmin}_k \left( \sum_{j=1, j\neq k}^{K} \|v_{dk,1}^H v_{dj,1}\|^2 \right)$$

$$d_2 = \mathrm{argmin}_k \left( \|v_{d1,1}^H v_{dk,1}\|^2 \right)$$

$$d_3 = \mathrm{argmin}_k \left( \|v_{d1,1}^H v_{dk,1}\|^2 + \|v_{d2,1}^H v_{dk,1}\|^2 \right)$$

$$\vdots$$

$$d_M = \mathrm{argmin}_k \left( \|v_{d1,1}^H v_{dk,1}\|^2 + \|v_{d2,1}^H v_{dk,1}\|^2 \ldots + \|v_{d(M-1),1}^H v_{dk,1}\|^2 \right)$$

where M is the number of the selected user terminals, K is the number of the plurality of user terminals that are being serviced by the BS, $d_l$ to $d_M$ are the indexes of the selected user terminals, and $v_{dk,1}$ is a principal eigen vector fed back from a $d_k$th user terminal.

7. The method of claim 4, wherein in the user terminal selecting step, a total number of selected user terminals matches a total number of the plurality of transmit antennas of the BS.

8. An apparatus for transmitting feedback information for data scheduling in a user terminal accessing a base station (BS) that services a plurality of user terminals each using a plurality of receive antennas via a plurality of transmit antennas, comprising:
    a channel estimator for estimating channel characteristics from the transmit antennas to the user terminal; and a channel characteristic analyzer and transmitter for decomposing the estimated channel characteristics into receive channel characteristics and transmit channel characteristics, calculating a principal eigen vector representing a largest value of the transmit channel characteristics and feeding back the transmit principal eigen vector to the BS;

wherein the channel characteristic analyzer and transmitter decomposes the channel characteristics by $$H_k = U_k \Lambda_k V_k^H$$
$$= [\mu_{k,1}, \mu_{k,2}, \ldots, \mu_{k,M}][\lambda_{k,1}, \lambda_{k,2}, \ldots, \lambda_{k,M}][v_{k,1}, v_{k,2}, \ldots, v_{k,M}]^H$$

where $H_k$ is a channel matrix representing channel characteristics for a kth user, $U_k$ is a matrix representing receive channel characteristics for the kth user, $\mu_{k,i}$ is a vector representing the receive channel characteristic of an ith sub-channel, $\Lambda_k$ is a diagonal matrix representing channel gains for the kth user, $\lambda_{k,i}$ is a constant representing the channel gain of the ith sub-channel, $V_k$ is a matrix representing transmit channel characteristics for the kth user, and $v_{k,i}$ is a vector representing the transmit channel characteristic of the ith sub-channel.

9. The apparatus of claim 8, wherein the channel characteristic analyzer and transmitter feeds back $v_{k,1}$ to the BS in the feedback step.

10. The apparatus of claim 8, further comprising a decoder for detecting a desired data stream by a signal received from the BS by $\mu_{k,i}^H$.

11. An apparatus for scheduling data for a plurality of user terminals based on principal eigen vectors fed back from the user terminals in a base station (BS) that services the user terminals each having a plurality of receive antennas via a plurality of transmit antennas, comprising:

a scheduler for selecting a predetermined number of user terminals having a least correlation using the feedback principal eigen vectors from the plurality of user terminals; and a precoder for constructing a user precoding matrix by combining the principal eigen vectors of the selected user terminals, multiplying data streams for the selected user terminals by the user precoding matrix and transmitting the multiplied data.

12. The apparatus of claim 11, wherein the scheduler selects a first user terminal having a least correlation with respect to the other plurality of user terminals, and then sequentially selects additional user terminals each having the least correlation with respect to the other user terminals, except earlier selected user terminals.

13. The apparatus of claim 12, wherein the scheduler selects the user terminals by $$d_1 = \mathrm{argmin}_k \left( \sum_{j=1, j \neq k}^{K} \|v_{dk,1}^H v_{dj,1}\|^2 \right)$$
$$d_2 = \mathrm{argmin}_k \left( \|v_{d1,1}^H v_{dk,1}\|^2 \right)$$
$$d_3 = \mathrm{argmin}_k \left( \|v_{d1,1}^H v_{dk,1}\|^2 + \|v_{d2,1}^H v_{dk,1}\|^2 \right)$$
$$\vdots$$
$$d_M = \mathrm{argmin}_k \left( \|v_{d1,1}^H v_{dk,1}\|^2 + \|v_{d2,1}^H v_{dk,1}\|^2 \ldots + \|v_{d(M-1),1}^H v_{dk,1}\|^2 \right)$$

where M is the number of the selected user terminals, K is the number of the plurality of user terminals that are being serviced by the BS, $d_1$ to $d_M$ are the indexes of the selected user terminals, and $v_{dk,1}$ is a principal eigen vector fed back from a $d_k$th user terminal.

14. The apparatus of claim 11, wherein the scheduler selects a total number of user terminals matching a total number of the plurality of transmit antennas of the BS.

* * * * *